Patented Feb. 3, 1953

2,627,451

UNITED STATES PATENT OFFICE 2,627,451

DISPROPORTIONATION OF SILANE DERIVATIVES

Charles E. Erickson, Buffalo, and George H. Wagner, Kenmore, N. Y., assignors, by mesne assignments, to Union Carbide and Carbon Corporation, a corporation of New York No Drawing. Application April 22, 1948, Serial No. 22,703

3 Claims. (Cl. 23—14)

Various schemes for the preparation of chlorosilane compounds include, as the initial step, a reaction between heated hydrogen chloride and silicon in the presence of a catalyst such as copper. The principal product is usually trichlorosilane, $SiHCl_3$; but other products are formed, including a minor proportion of dichlorosilane, $SiH_2Cl_2$. The latter compound is particularly useful in many syntheses, and in some cases it would be economically desirable to prepare it from the trichloro compound, even though only moderate efficiencies could be attained in the conversion. The present invention relates to such a conversion, and to analogous operations on other silane derivatives.

We have found that trichlorosilane can be disproportionated, with a redistribution of the hydrogen and chlorine atoms in such a way that considerable quantities of dichlorosilane are formed. Such disproportionation is effected by heating the trichlorosilane at a temperature above that sufficient to reflux, and preferably at a temperature of 300° C. or above. The presence of a catalyst, such as $AlCl_3$, $AlBr_3$, $FeCl_3$, $CoCl_3$, $BF_3$, etc., promotes the efficiency of this reaction, and since the requisite temperatures are above the boiling point of $SiHCl_3$, it is convenient to seal the latter in a pressure vessel with the catalyst before applying heat, or to pass the vapors of $SiHCl_3$ continuously over a bed of the catalyst.

The following table exhibits the results obtained in such operations, using charges of 100 cc. of $SiHCl_3$ in a 300 cc. vessel, and varying the quantity of catalyst ($AlCl_3$), the time, and the temperature as indicated:

| Grams $AlCl_3$ | Temperature, ° C. | Time, Hours | $SiH_2Cl_2$ in Product, Percent by Weight |
|---|---|---|---|
| 1.0 | 200 | 2.6 | Nil |
| 1.0 | 300 | 3.0 | 1 |
| 1.0 | 350 | 0.5 | 3 |
| 2.0 | 350 | 2.0 | 13 |
| 1.0 | 350 | 2.2 | 14 |
| 1.0 | 350 | 4.0 | 13 |
| 2.0 | 350 | 4.2 | 14 |
| 1.0 | 400 | 0.8 | 12 |
| 0.2 | 400 | 2.0 | 15 |
| 1.0 | 400 | 2.0 | 15 |
| 1.0 | 400 | 4.0 | 13 |
| 0.2 | 450 | 2.0 | 11 |

It will be noted that yields of $SiH_2Cl_2$ as high as 15% can be obtained in times of two hours or less, at temperatures above 300° C. The product also contains unchanged $SiHCl_3$ which can be recovered and reprocessed.

The following data shows that the disproportionation will proceed, although at a slower rate, in the absence of a catalyst. This data was obtained in the same apparatus used in the aforesaid catalyzed reaction, with variations in temperature and time as indicated, and with other conditions identical, except for the ommission of the catalyst.

| Temperature, ° C. | Time, Hours | $SiH_2Cl_2$ in Product, Percent by Weight |
|---|---|---|
| 350 | 1.7 | 2.7 |
| 350 | 2.0 | 1.5 |
| 400 | 2.4 | 7.6 |
| 400 | 15.0 | 10.7 |
| 450 | 2.0 | 8.5 |
| 450 | 3.5 | 3.4 |

Some aspects of the process are suggested by the equation $$2SiHCl_3 \rightarrow SiH_2Cl_2 + SiCl_4$$

but the picture given thereby is obviously an incomplete one. Several other products are formed, though in smaller proportion.

The process can also be applied to the trialkoxy silanes to form mixtures of the dialkoxy and tetralkoxy compounds, together with by-products. In this case the reaction goes readily at reflux temperature (130–135° C.). In one experiment 16% of diethoxy silane was obtained when 56 grams of triethoxy silane were refluxed for six hours with 0.1 gram $AlCl_3$ present, and, under similar conditions, di-isopropoxy silane was made by heating the tri-isopropoxy derivative.

While the disproportionation of tri-substituted silanes has been stressed herein because it appears to have more important industrial applications under present conditions, the di- and mono-substituted silanes can also be disproportionated under similar conditions, and with the same catalysts. In each case the product contains compounds in which the ratio of substituent to silicon is respectively lower and higher than in the material taken. Thus, the unsubstituted silane is usually formed to some extent.

What is claimed is:

1. Process of disproportionating tri-chloro silane to form di-chloro silane, which comprises heating the tri-chloro silane to a temperature of at least about 300° C. in the presence of an acid catalyst of the metal halide type.
2. Process of disproportionating a tri-halogeno silane, to form the corresponding di-halogeno silane, which comprises heating the tri-halogeno silane to a temperature of at least about 300° C. in the presence of an acid catalyst of the metal halide type.

3. Process of disporportionating a tri-halogeno silane, to form the corresponding di-halogeno silane, which comprises heating the tri-halogeno silane to a temperature of at least about 300° C. in the presence of an aluminum chloride catalyst.

CHARLES E. ERICKSON.
GEORGE H. WAGNER.

REFERENCES CITED

The following references are of record in the file of this patent:

UNITED STATES PATENTS

| Number | Name | Date |
|---|---|---|
| 2,458,703 | Hatcher | Jan. 11, 1949 |

OTHER REFERENCES

Mellor: "Comprehensive Treatise on Inorganic and Theoretical Chemistry," vol. VI (1925), pages 968, 970, 980.

Volnov: "Jour. Gen. Chem." (U. S. S. R.), vol. 17 (1947), pages 428–35. In Chem. Abstracts, vol. 42 (1948), columns 2230, 2231.

Forbes et al.: "Jour. Amer. Chem. Soc.," vol. 67 (1945), pages 1911–1914.

Anderson: "Jour. Amer. Chem. Soc.," vol. 66 (1944), pages 934, 935.

Whitmore: "Jour. Amer. Chem. Soc.," vol. 69 (August 1947), pages 1976–1977.

Post: "Chemistry of Aliphatic Ortho Esters" (1943), pages 146, 147, Reinhold, publishers.

Hackh's Chemical Dictionary, pp. 315, 2d ed., 1937, Blakiston's Son & Co. Inc., Phila., Pa.

Heal: "Nature," pages 672–3, vol. 158, 1946.